No Printed Specification Available
6887X
D. STEM.
Dressing Millstones.
Patented Jan. 5, 1832.
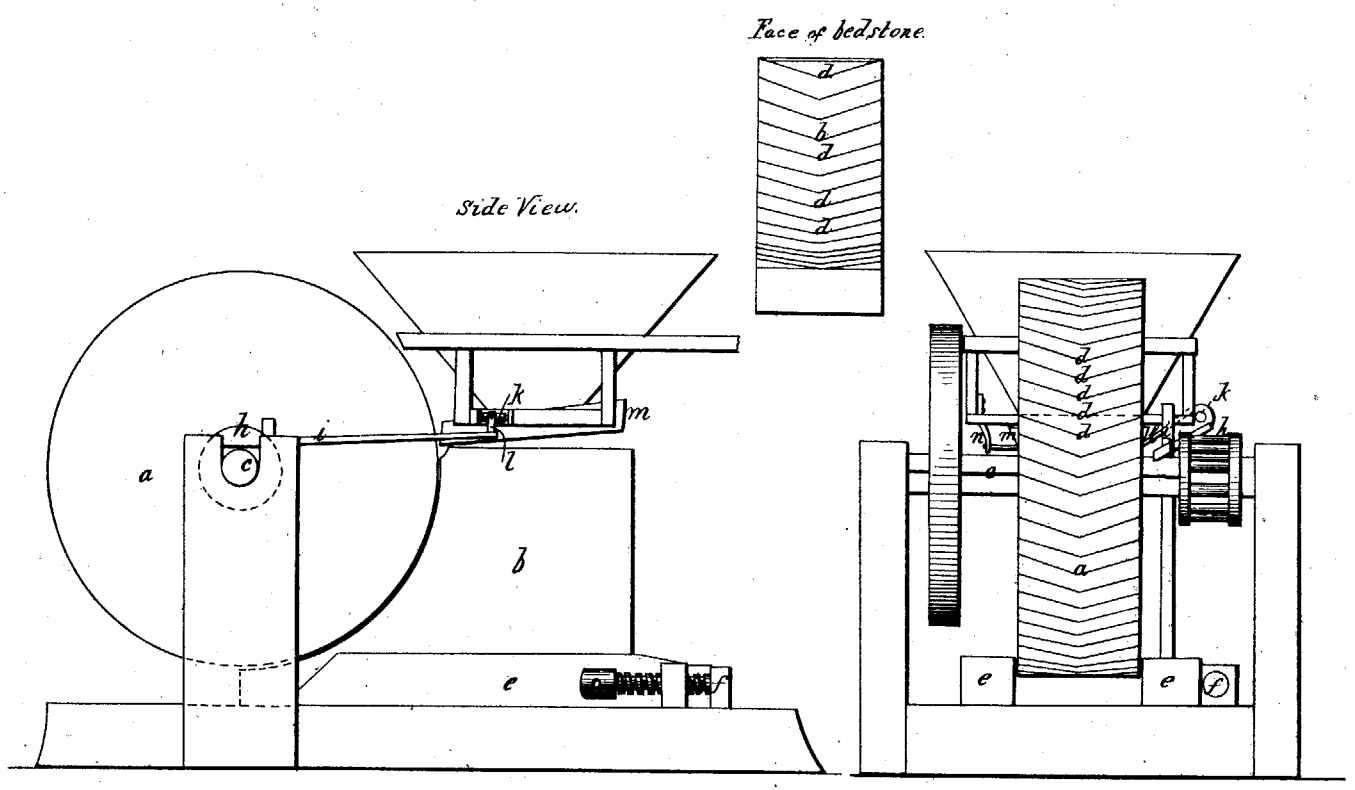
THE NORRIS PETERS CO., PHOTO-LITHO., WASHINGTON, D. C.

6887X Jan. 5. 1832

David Stone of Vanderburgh County Indiana

Letters Patent.

The Schedule referred to in these Letters Patent and making part of the same containing a description of the said David Stone himself of his improvement in the Mill stone.

To all to whom these presents shall come. Be it known that I David Stone of the County of Vanderburgh and State of Indiana. have invented a new and useful improvement in the millstone for grinding grain and the following is a full and exact description of the construction and operation of the said improvement as invented or improved by me. The runner stone is round and hangs on a spindle which [illegible] horizontal as a grindstone with the face on the edge of circumference as the grind stone. the permanent or bed stone is cut with an inverted circle to extend one third of the distance round the runner stone when not larger than 20 inches in diameter. 20 inches will [illegible] although it may be enlarged when you have power to put it in operation. The bed stone is set in a perpendicular position filling the lower part of the inverted circle close to the lower centre of the runner stone and letting it extend as far upwards as its size will take it. each stone is cut with furrows and lands. one contrary to the other so as to run shearing. the lands & furrows must be small and narrow. The runner stone must be furrowed with a draft from the centre of the face to each edge. beginning at each edge and pointing towards the bed stone until both furrows meet calculating 1/4 inch draft on a stone a foot wide on the face. which is a proper width for a stone 20 inches in diameter. The bed stone must be furrowed with the draft contrary to the runner. the upper part of the bed stone must be drafted open to chop grain gradually and close towards the bottom for flouring. the bed stone should be an oblong square accepting the face. it must be confined between two timbers permanent, yet so that it can be moved backwards and forwards as much as to grind coarse or fine. which is done by a [illegible] with a screw in the lower end to keep it to its place. there may be a fly wheel attached to the spindle that runs the stone. likewise a [illegible] on the spindle and run by any common gearing. The spindle must be [illegible] square some distance outside of the stone. there must be a small post set up 4 or 6 inches from the spindle, in which 6887x          Jan 5, 1832 there is a mortise with a rattle staff fixed in on a pivot with one end extending over the squares of the spindle [illegible] and the other end extending to the side of the hopper drawing a strap over a pulley which strap extends thro the shoe to the other side of the hopper, fastened to a spring. The shoe must be wide at the mouth to scatter the grain clear across the whole width of the stone. There must be a small edge made round the mouth of the stones for the grain to drop in, out of the shoe to keep it from scattering. The spindle must only have two journals and that must be on each end. The Stone, wallower and fly if one be attached must all be between the journals.

Exyd. Wh.  Those spurs on the circles are positions and draught of the furrows ——

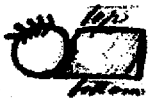

Witnesses
A Fairchild
E. Riggs.

David Stem 630 wd.